B. H. NOELTING.
Animal-Trap.
No. 209,068.  Patented Oct. 15, 1878.
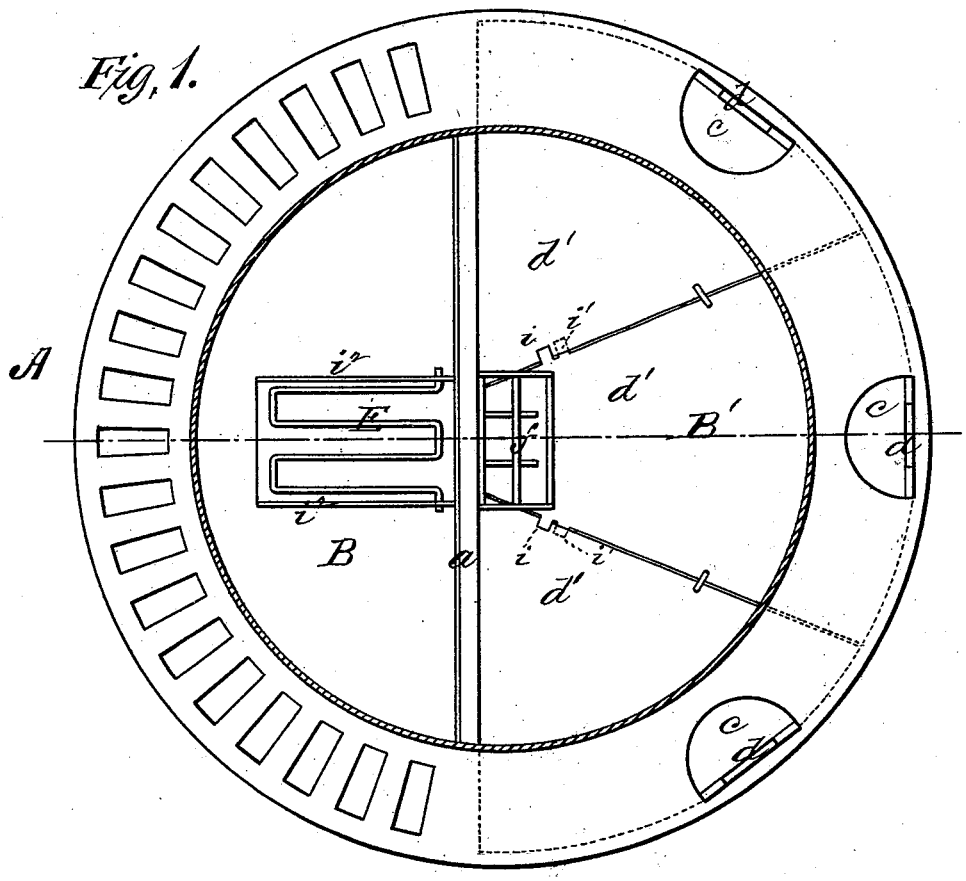
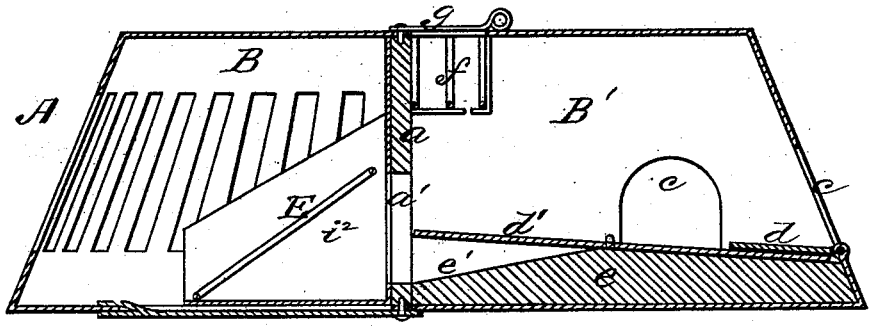

UNITED STATES PATENT OFFICE.

BERNHARD H. NOELTING, OF NEBRASKA CITY, NEBRASKA.

IMPROVEMENT IN ANIMAL-TRAPS.

Specification forming part of Letters Patent No. 209,068, dated October 15, 1878; application filed April 13, 1878.

*To all whom it may concern:*

Be it known that I, BERNHARD HENRY NOELTING, of Nebraska City, in the county of Otoe and State of Nebraska, have invented a new and valuable Improvement in Mouse and Rat Traps; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a horizontal section of this invention. Fig. 2 is a vertical central section of the same.

The nature of the invention consists in the construction and novel arrangement of a vermin-trap having a lighted compartment and an entrance compartment, communicating by a passage in the dividing-wall, the parallel guarding-walls, and a fall in rear of said passage, and in front of the same the tilting floor-sections, laterally engaging with each other and resting on a double inclined bottom, and a bait-crate arranged above said floor-sections, as will be hereinafter shown and described.

In the annexed drawings, the letter A designates a preferably metallic box of dimensions proportionate to the size of the animals to be captured and of the form of a conical frustum. This box is divided by a diametrical partition, $a$, into two compartments, B B', communicating with each other through an aperture, $a'$. The compartment B has a slatted side wall, and the compartment B' a side wall provided with a number of entrance-apertures, $c$, that are closed at the times that an animal enters the trap by the doors $d$, opening inward and hinged to the lower horizontal edge of the said apertures.

The wall of the trap being inclined, the doors naturally assume a horizontal position and leave the apertures $c$ open. In the compartment B', above the bottom of the box, is a second bottom, composed of a number of triangular sections, $d'$. These latter are equal in number to the entrances $c$, which are at the middle of their outer curved edges, and, while they are independent of each other, the lateral edges of the side sections are loosely engaged between lugs $i$ $i^1$ of the central one.

The bottom $e$ of the trap inclines upward and backward from the entrances $c$ to a point a little more than half-way to the partition $a$, from which point it inclines downward, as shown at $e'$, Fig. 2, and the sections $d'$ extend from the entrances $c$ backward to the partition in the line of continuation of the upward incline, the center section bisecting the circular aperture $a'$ of the said partition.

The bait is placed in a metallic crate, $f$, and introduced into the compartment B' through an aperture in the top of the box, which, being closed by a sliding door, $g$, will not light up this part of the trap. An animal, on entering the trap, naturally goes to the bait-crate $f$, that is above the aperture $a'$ in the partition $a$, and his weight causes the central section to tip, thereby disclosing the aperture $a'$ and closing the doors $d$. Light is thus excluded from the compartment B'; but the compartment B being fully lighted, the animal is attracted into it by the light through the aperture $a'$. Upon passing into the compartment B the animal raises a light metallic frame, E, hinged to the partition $a$ above the aperture $a'$, with its free end resting upon the bottom of the trap.

The frame E, as shown in Fig. 1, is inclined, and it is included between two spaced vertical walls, $i^2$, which prevent the animal, after the frame has fallen, from passing back into the compartment B'. As soon as the animal relieves the sections $d'$ of his weight they tip back into the position shown in Fig. 2, and allow the doors to swing inward and open the entrances $c$. The sections $d'$ being loosely connected by the spurs $i$ $i^1$, the tilting of one causes them all to tilt, and the doors to be closed and opened automatically.

I am aware that a vermin-trap having a hinged entrance-gate closed by a tilting platform, combined with the end or ends of a passage, in combination with a second passage, box, and drop-gate, is not new; hence I make no claim, broadly, to such devices.

Having described my invention, I claim as new and desire to secure by Letters Patent—

The vermin-trap having a lighted compartment, B, and entrance-compartment B', communicating by the passage $a'$ in the dividing-wall $a$, the parallel guarding-walls $i^2$, and the fall E in rear of said passage, and in front of the same the tilting floor-sections $d'$, laterally engaging with each other, resting on a double inclined bottom, $e$, and the bait-crate $f$, arranged above said floor-sections, substantially as specified.

In testimony that I claim the above I have hereunto subscribed my name in the presence of two witnesses.

B. H. NOELTING.

Witnesses:
 D. T. HAYDEN,
 B. S. HAYDEN.